Dec. 11, 1923.
G. R. NORTHRUP
BRACKET FOR MOUNTING PULLEYS
Filed Aug. 8, 1921
1,477,229
2 Sheets-Sheet 1
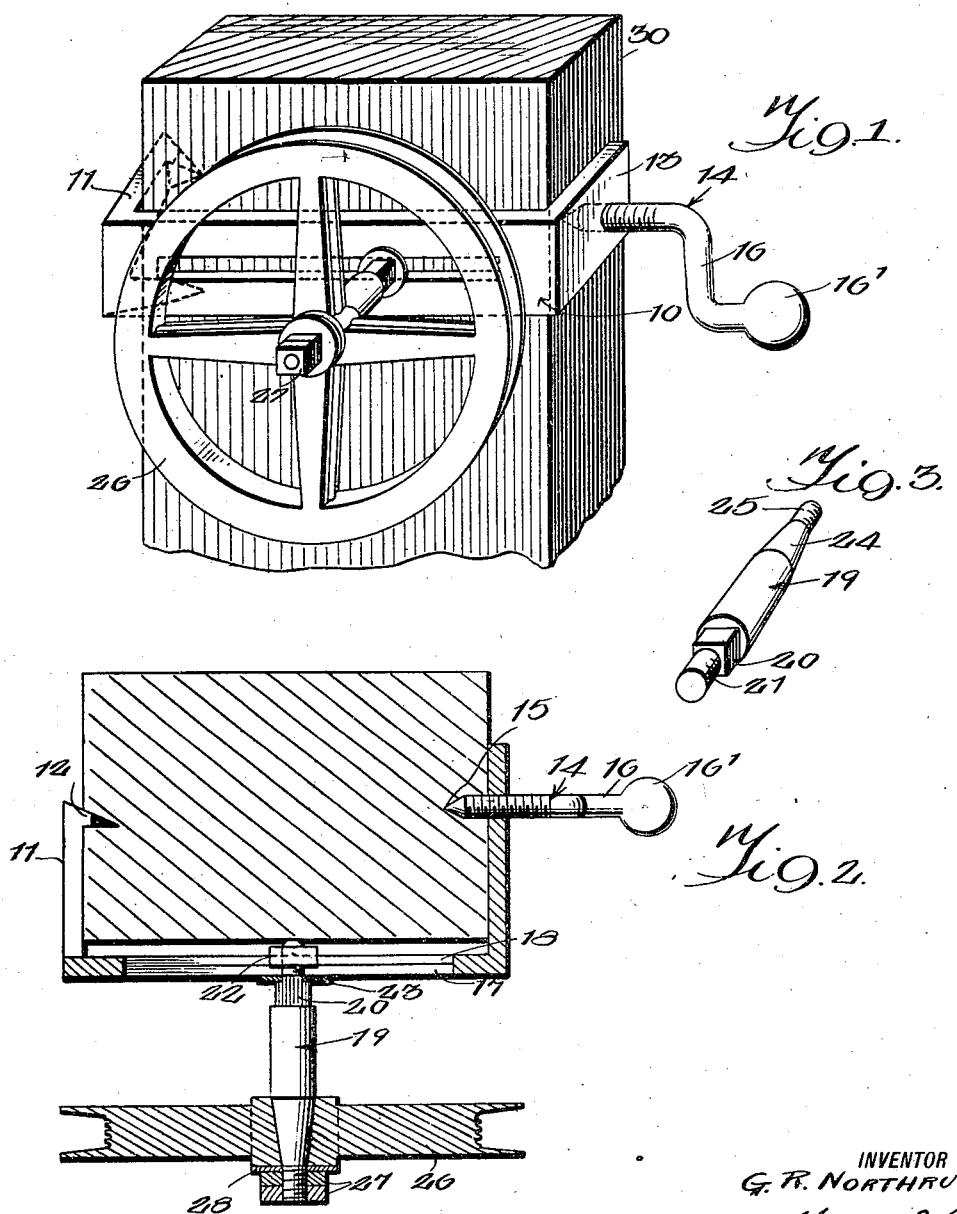
INVENTOR
G. R. NORTHRUP
BY Munn & Co.
ATTORNEYS Dec. 11, 1923.

G. R. NORTHRUP

BRACKET FOR MOUNTING PULLEYS

Filed Aug. 8, 1921

WITNESSES
George C. Myers

INVENTOR
G. R. NORTHRUP,
BY
Munn & Co.,
ATTORNEYS

Patented Dec. 11, 1923.

1,477,229

UNITED STATES PATENT OFFICE.

GEORGE RAYMOND NORTHRUP, OF LARAMIE, WYOMING.

BRACKET FOR MOUNTING PULLEYS.

Application filed August 8, 1921. Serial No. 490,579.

*To all whom it may concern:*

Be it known that I, GEORGE R. NORTHRUP, a citizen of the United States, and a resident of Laramie, in the county of Albany and State of Wyoming, have invented certain new and useful Improvements in Brackets for Mounting Pulleys, of which the following is a specification.

This invention relates to a bracket for mounting pulleys.

In the use of pulleys, it often occurs that it is desirable to move the pulley for tightening the rope or cable which passes thereabout. Likewise, it is often desirable to move the pulley vertically.

The object of the present invention is to provide a bracket upon which a pulley may be rotatably carried and permit these different advantages to be had, that is, with respect to raising or lowering the pulley or shifting the pulley in a direction for tightening the cable or rope which passes thereabout.

Other objects will hereinafter appear.

The invention is illustrated by way of example in the accompanying drawings, in which—

Figure 1 is a perspective view of a pulley mounted upon a support by a bracket constructed in accordance with the present invention, Figure 2 is a central horizontal sectional view of the same, Figure 3 is a perspective view of the pin for journalling the pulley upon the bracket.

Figure 4:
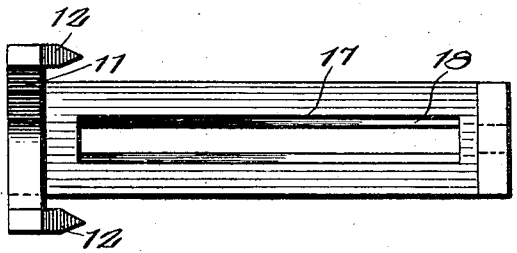
Figure 4 is an inside elevation of the bracket.
Figure 5:
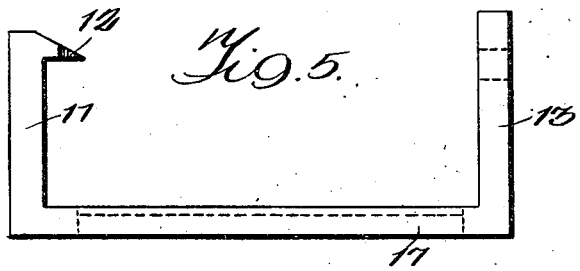
Figure 5 is a top plan view of the same.
Figure 8:
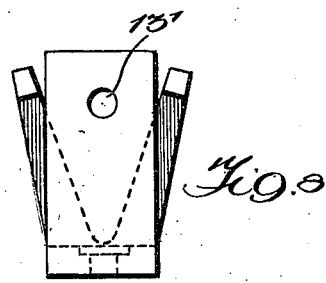
Figure 8 is an end elevation of the form of bracket shown in Figure 7.

Referring to the drawings more particularly, 10 indicates generally a substantially U-shaped bracket, one leg of which comprises a pair of diverging arms 11, each of which is formed at its inner end with an inwardly extending pointed tooth 12, while the other leg 13 of said U-shaped bracket is formed with a threaded opening 13′ adapted to receive the threaded end of a screw 14, said screw 14 being pointed at its inner end as at 15, and its outer end being formed with a crank portion 16 which terminates in a ball 16′ adapted to be grasped for manually rotating said screw.

The bridge portion of the U-shaped bracket is formed with a slot 17 which extends longitudinally thereof, as shown, and each side wall of the slot is formed with an offset 18. A pin 19 is provided which has formed adjacent its one end a squared portion 20 and a threaded end portion 21. The threaded portion 21 is adapted to extend through the slot 17 and a square nut 22 is threaded upon said portion and said nut being adapted to seat upon the offsets 18 and to be held against turning movement. Between the squared portion and outer side of the bracket member there is interposed a washer plate 23 which is adapted to limit the inward movement of the pin 19.

Adjacent the other end of the pin 19 there is formed a tapered portion 24 and a threaded end portion 25. The tapered portion 24 rotatably supports a pulley 26, and upon the threaded portion there is positioned a pair of lock nuts 27 and a washer plate 28 by which the pulley 26 may be held in position. While a particular type of pulley is shown it is of course to be understood that any type of pulley may be used, the same in each instance being suitably journaled upon the outer end of the pin 19.

In the use of the present device, the same is positioned upon a support similar to that shown in Figure 1 and indicated by the reference numeral 30. In positioning the bracket the same is slid upon the support, as shown, and the screw 14 is rotated by the means of the handle 16 so that the same will penetrate the support 30 and at the same time draw into the support the teeth 12 of the arms 11. The bracket is in this manner rigidly held to the support. In case it is desired to raise or lower the pulley 26 then of course, it is only necessary to rotate the screw 14 for withdrawing the same from the support 30 and then by pounding upon the leg 13 of the U-shaped bracket, the teeth 12 of the arms 11 may be freed from the support 30, and the bracket as a whole together with the pulley be raised or lowered to the desired position, and again secured upon the support 30, by rotating the screw 14 in the opposite direction as heretobefore described.

When it is desired to move the pulley 26 in a direction for tightening or loosening the cable or rope extending thereabout, it is only necessary to apply a wrench to the squared portion 20 of the pin 19 and by turning the pin 19 in the proper direction, the nut 22 may be loosened sufficiently to permit the pin as a whole to be slid longitudinally of the slot 17. When the pulley has been suitably adjusted the pin 19 may again be turned for tightening the nut 22.

Figure 6:
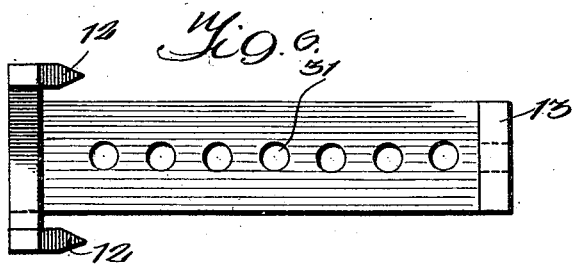
Figures 6 and 7 are views similar to Figure 4 showing modified forms of the bracket.

Referring to Figure 6, it will be seen that instead of providing the slot 17 in the bridge portion of the bracket member, a plurality of openings 31 are provided. The openings 31 are each adapted to receive the threaded portion 21 of the pin 19, and in this way the pin may be adjustably positioned upon the bracket.

Figure 7:
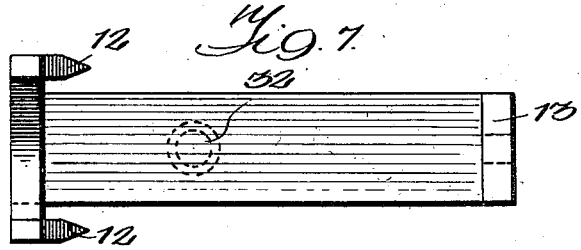
Figure 9:
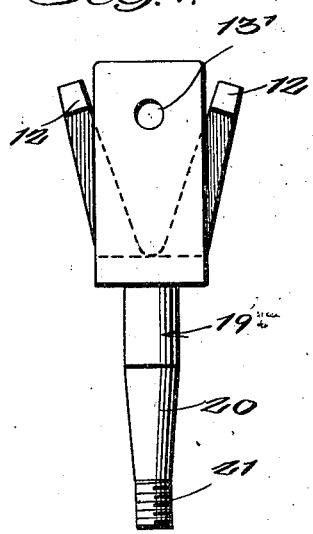
Figure 9 is an end elevation of the bracket shown in Figure 5 and the supporting or journalling pin for the pulley being also shown.

Referring to Figure 7, the same construction of the bracket is shown with the exception that instead of the plurality of openings 31 as shown in Figure 1, only one opening is shown as at 32 which is adapted to likewise receive the threaded portion 21 of the pin 19. In this instance the position of the pulley can not be changed with respect to the bracket.

I claim:—

1. In combination, a U-shaped bracket member, means by which said bracket may be detachably secured to a support, a slot in the bridge portion of said bracket, a pin having its one end extending through said slot and adjustably secured against movement, and a pulley journaled on the outer end of said pin.

2. In combination, a U-shaped bracket, means by which said bracket may be detachably secured to a support, a slot in the bridge portion of said bracket extending longitudinally thereof, a pin having its one end extending through said slot and adjustably secured against movement, and a pulley journaled on the outer end of said pin.

3. In combination with a U-shaped bracket having a slot formed in its bridge portion, said slot extending longitudinally of said bridge portion, and said slot having an offset formed in each side wall thereof, said offset occurring upon one side of the bridge portion of said bracket, a pin having a reduced end portion, said reduced end portion being adapted to extend through said slot, a washer interposed between the shoulder formed by said reduced end portion and the associated side surface of the bridge portion of said bracket, and a nut threaded upon the reduced portion of said pin and adapted to seat in said offsets formed in the side walls of said slot.

GEORGE RAYMOND NORTHRUP.